Sept. 22, 1936.  E. R. MAURER  2,055,300
CLUTCH
Filed Jan. 19, 1934.
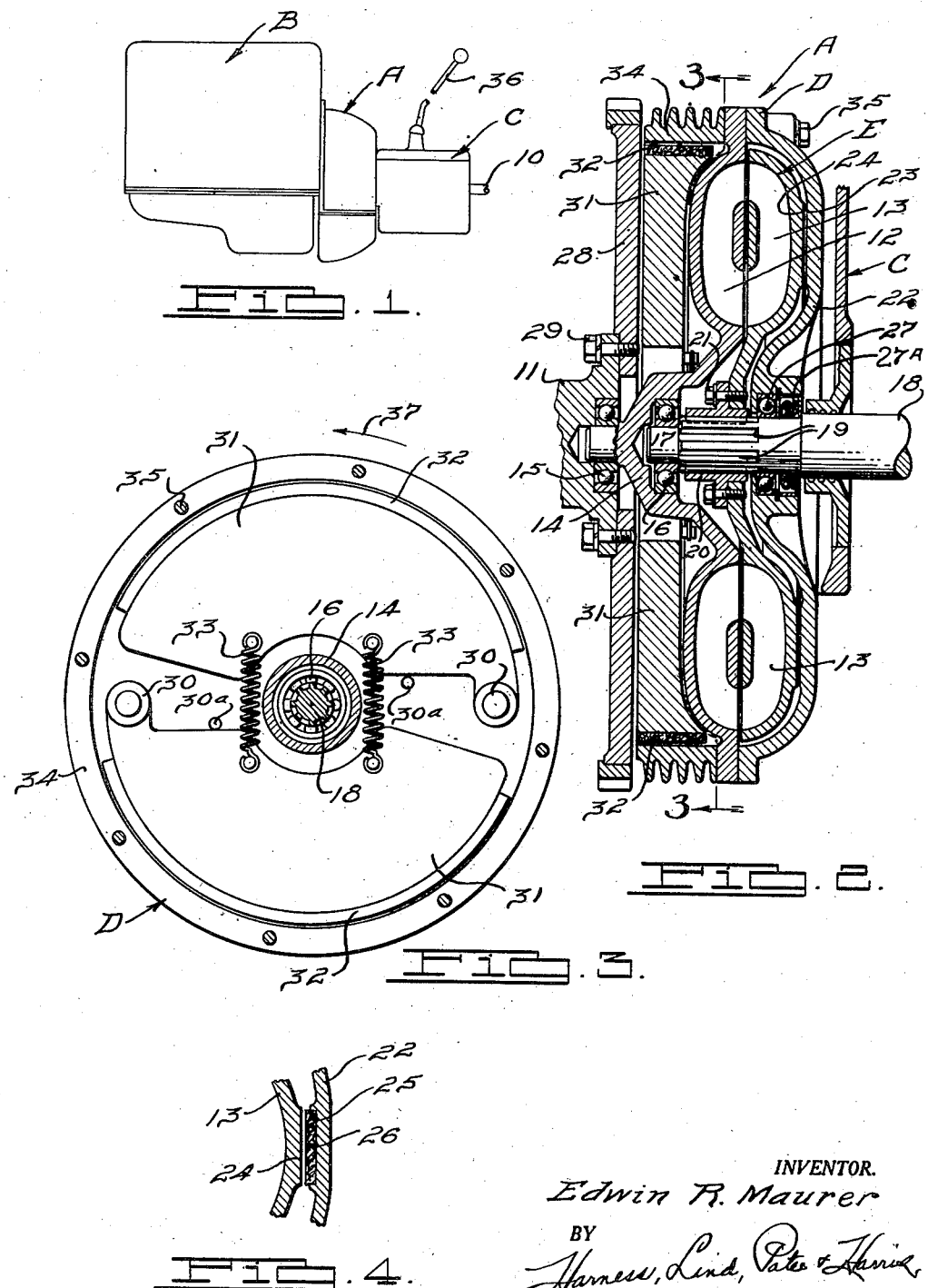
INVENTOR.
Edwin R. Maurer
BY
ATTORNEYS Patented Sept. 22, 1936

2,055,300

UNITED STATES PATENT OFFICE 2,055,300

CLUTCH

Edwin R. Maurer, Detroit, Mich., assignor to Chrysler Corporation, Detroit, Mich., a corporation of Delaware Application January 19, 1934, Serial No. 707,283

7 Claims. (Cl. 192—48)

This invention relates to clutches and driving mechanisms therefor, and refers more particularly to improvements in fluid clutches and controls therefor.

Heretofore, it has been customary in clutches of the fluid type to rely on the fluid circulated between the driving and driven clutch vane members to establish the driving connection through the clutch at substantially all speeds of operation thereof, and particularly at relatively high speeds of rotation. At low speeds a certain amount of slipping between the clutch members is ordinarily desirable in smoothly picking up the load between the driving and driven clutch members, and the fluid clutch is of advantage in permitting such slippage without wear usually attendant to more common forms of friction clutches.

Clutches of the aforesaid type may be used to advantage in transmitting power from an engine of a motor vehicle to a speed changing transmission, by way of example, and when so used it is apparent that much of the motor vehicle operation is under conditions of direct drive through the clutch.

My invention has particular significance in connection with motor vehicle clutches of the aforesaid type, although not limited thereto in its broader aspects; one object thereof residing in the provision of means for drivingly connecting the clutch members in addition to the driving connection afforded by the fluid circulated by the clutch.

A further object of my invention resides in the provision of means for increasing the efficiency of fluid type clutches or the like by causing engagement of the clutch members. This engaging means, in the preferred embodiment of my invention, is preferably of a yielding or slipping character so that slippage of the clutch members may take place, even at high speeds, such conditions being desirable in certain instances of operation of the motor vehicle or other mechanism embodying the clutch.

In carrying out the objects of my invention, I have provided means establishing a frictional engagement for the fluid clutch members, such engagement being responsive to a predetermined speed of rotation of the driving or driven clutch members, preferably the former. Thus, by way of illustrating my invention, I have provided a driven clutch member which is shiftable or displaceable into engagement with the driving clutch member in response to forces produced by the driving clutch member.

A further object of my invention resides in the provision of a clutch having a coupling mechanism associated therewith, the coupling being adapted to automatically engage and disengage the clutch with respect to the clutch driving means. This feature of my invention is especially adapted for use in connection with fluid clutches although, in the broader aspects of my invention, other types of clutches may be employed. This coupling mechanism is preferably in the form of a centrifugal coupling or clutching means responsive in its actuation to the speed of rotation of the driving means such as the engine.

By reason of my invention I have provided an improved degree of flexibility and smoothness of drive between the engine and transmission. If desired, the usual clutch operating pedal may be eliminated, the clutch automatically engaging and disengaging with the desired degree of smoothness. I have also eliminated undesirable shocks on the transmission parts heretofore occasioned by too sudden clutch engagement.

My invention also eliminates clutch drag heretofore experienced with clutches at idling speeds, referring especially to fluid clutches and I have further eliminated the possibility of stalling the engine heretofore occasioned by a too rapid clutch engagement.

A still further object of my invention resides in the provision of a fluid coupling or clutch having a substantially oblong shape in its radial direction whereby the clutch will occupy less space than in the case of fluid couplings employed heretofore and also for improving the efficiency of the clutch as will be hereinafter more apparent.

Further objects and advantages of my invention will be apparent from the following detailed description of several embodiments thereof, reference being had to the accompanying drawing, in which:

Fig. 1 is a side elevational somewhat diagrammatic view of my clutch intermediate an engine and a transmission.

Fig. 2 is a sectional elevational view through my clutch.

Fig. 3 is a sectional elevational view along the line 3—3 of Fig. 2.

Fig. 4 is a detailed sectional view illustrating a modified form of my supplemental clutch engaging means.

Referring to the drawing, I have illustrated my clutch A in association with an engine B and transmission C, the engine and transmission being of any desired types. The drive from engine B is controlled by clutch A, the latter transmitting the drive to transmission C, 10 representing the power take-off shaft such as the propeller shaft of a motor vehicle, for example.

This clutch A is adapted to be driven by the engine having a driving shaft 11. The clutch consists of a driving structure D and a driven structure E, these structures being provided with working clutch members or cooperating vane members 12 and 13, respectively.

The vane members 12 and 13 are formed substantially oblong in their radial direction in order to provide a more compact arrangement of the fluid clutch axially of shaft 18; such shape further providing greater efficiency of fluid drive with respect to more circular shapes owing to the more direct route of fluid flow from the inlets to the outlets of the vanes.

The driving structure D is connected by suitable means with the engine driving shaft 11, and while these parts may be fixedly secured against relative movement, I prefer, as one feature of my invention, to provide improved coupling or clutching means between these parts as will be presently apparent. This driving structure D is adapted to substantially house the driven structure E, the driving member 12 having a hub 14 piloted by a bearing 15 in driving shaft 11. The hub 14 receives a bearing 16 piloting the end 17 of the driven shaft 18, the latter having splines 19 engaged by a hub 20 connected by fasteners 21 to the driven clutch member 13. The rear casing 22 of the clutch driving structure D has a surface 23 engageable by a companion surface 24 of driven member 13, these surfaces being slightly spaced when clutch A is not transmitting the drive as will be presently apparent. If desired, in order to increase the frictional engagement of surfaces 23, 24, either or both of these parts may be provided with an annular band of friction brake material. Thus in Fig. 4, I have shown the casing 22 provided with an annular recess 25 receiving the friction material 26 engageable by surface 24 of the driven clutch member 13.

The driving structure D is provided with a suitable bearing 27 and sealing means 27a adapted to prevent escape of the fluid, such as oil, circulated within the clutch in transmitting the drive from the vane member 12 to the vane member 13, the oil being guided outwardly by centrifugal force in the vanes of the driving member 12 and inwardly of the vanes of the driven member 13 in establishing the fluid coupling in a manner well understood in the art.

Referring now to my novel centrifugal coupling means between driving shaft 11 and fluid clutch A, the shaft 11 is provided with a flywheel portion 28 secured thereto at 29, this flywheel carrying pins 30 extending rearwardly therefrom as shown in Fig. 3. Pivoted to each pin 30 is a weight 31, each weight functioning as a clutching member and preferably having a band portion 32 of suitable friction material such as customarily used for brake linings.

One or more springs 33 interconnect weights 31 and urge the weights toward each other to the positions against stops 30a as shown in Fig. 3. When shaft 11 is rotated by engine B, weights 31 are rotated with flywheel 28 and when the centrifugal force acting on the weights overcomes the opposing force of springs 33, the weights will swing outwardly on their pivots 30 to cause the friction bands 32 to engage the annular clutching member 34, the latter being secured to the driving structure D by fasteners 35.

In operation, I prefer to provide the springs 33 of such force that when engine B is idling and not driving shaft 10, the weights 31 will be pulled inwardly free from engagement with clutch member 34; the weights establishing a clutching engagement between flywheel 28 and member 34 when the engine is speeded up above its idling speed. In this manner the driving structure D and driven structure E of the fluid clutch are idle whenever weights 31 are contracted thereby eliminating drag between these parts, preventing engine stalling, and otherwise improving the efficiency of the power transmission system.

While the engine is idling, the gear shift lever 36 of transmission C may be shifted to any desired speed after which the engine may be speeded up to cause weights 31 to drive the driving structure D from shaft 11. This drive in turn causes the driving member 12 to drive the driven member 13 and hence shaft 18 through the fluid medium. Since the weights 31 and springs 33 may be so proportioned that clutching engagement of the weights takes place above engine idling speed, the weights exert a torque on driving structure D accompanied by a certain amount of slip which serves as a cushion between the effort of the engine and the resistance of the transmission. As the engine speed is increased, the torque on the driving structure D rapidly increases to a maximum and the percentage of slip decreases until it becomes substantially zero. As the engine is decelerated to an idling speed, the weights are retracted by springs 33 and driving structure D is released, the engine being free to idle without exerting a torque on the transmission.

Owing to the path of travel of the fluid from member 12 to member 13, there is a force at all driving speeds of structure D tending to separate these members, this force being resisted by slightly axially shifting driven member 13 on splines 19 to engage surface 24 with surface 23 or friction material 26 in the Fig. 4 embodiment. This engagement not only eliminates the necessity for providing a thrust bearing for member 13 but also serves as a frictional driving connection between the members of the fluid driving connection. As the speed of rotation of driving structure D increases, this frictional connection also increases, increasing the efficiency of the fluid clutch and lessening the size thereof for a given load. I desire to point out that this supplemental driving connection may, if desired, be used where the driving structure D is at all times driven with shaft 11 instead of through my centrifugal clutch weights 31.

While arrow 37 indicates the direction of drive for the clutch member 34 as illustrated, I also desire to point out that this direction may be reversed or pivots 30 arranged to lead or pull weights 31 rather than to follow or push these weights, the latter arrangement being illustrated. Other modifications and changes will be readily apparent from the teachings of my invention and it is not my intention to limit my invention to the particular details shown and described for illustrative purposes.

What I claim is:

1. In a fluid clutch, driving and driven structures, one of said structures having a working member housed within the other, and fluid actuated means for automatically frictionally connecting said structures at a predetermined speed of rotation of one of said structures, said means including a friction surface carried by one of said structures and located in the path of the other of said structures, one of said structures being bodily shifted by the fluid, and means for trapping said fluid within said housing structure against escape therefrom during acceleration of said driving structure to said predetermined speed.

2. In a clutch for connecting driving and driven shafts, a driving structure, a driven structure connected to said driven shaft and adapted to receive the drive from said driving structure through a fluid medium, and means responsive to a predetermined speed of rotation of said driving shaft for connecting said driving structure thereto, said driven structure being slidable axially of said driven shaft for frictionally engaging said driving structure in response to movement of said fluid between said structures.

3. In a clutch for connecting driving and driven shafts, a driving member, a driven member adapted to actuate said driven shaft, fluid circulating means for driving said driven member from said driving member, clutching means for releasably connecting said members, and centrifugal force operating clutching means for releasably connecting said driving shaft with said driving member.

4. In a motor vehicle drive having an engine driven speed ratio changing device, a fluid coupling intermediate said engine and speed ratio changing device and adapted to provide a slipping drive therebetween, and a centrifugal clutch intermediate said engine and said fluid coupling and adapted to automatically establish the drive from said engine to said fluid coupling in response to the engine on accelerating reaching a predetermined speed in excess of its idling speed.

5. In a fluid clutch, driving and driven fluid circulating structures, one of said structures having a working vane carrying member housed within the other, means responsive to circulation of said fluid for automatically drivingly connecting said structures independently of said fluid at a predetermined speed of rotation of one of said structures, and means for trapping said fluid within said housing structure against escape therefrom during acceleration of said clutch just prior to and during operation of said connecting means.

6. In a motor vehicle drive having an engine driven speed ratio changing device, a fluid coupling intermediate said engine and speed ratio changing device and adapted to provide a slipping drive therebetween, and a centrifugal clutch intermediate said engine and said fluid coupling and adapted to automatically interrupt the drive between said engine and said fluid coupling in response to the engine on decelerating reaching a predetermined speed which is approximately its idling speed.

7. In a motor vehicle drive having an engine driven speed ratio changing device, a fluid coupling intermediate said engine and said speed ratio changing device and adapted to provide a slipping drive therebetween, and speed responsive clutching means intermediate said engine and said fluid coupling and adapted to automatically establish the drive from said engine to said fluid coupling in response to the engine on accelerating reaching a predetermined speed in excess of its idling speed, said speed responsive clutching means being further adapted to interrupt the drive between said engine and said fluid coupling in response to the engine on decelerating reaching a predetermined speed which is approximately its idling speed.

EDWIN R. MAURER.